United States Patent
Zou et al.

(10) Patent No.: US 9,357,514 B2
(45) Date of Patent: May 31, 2016

(54) METHODS FOR SYNCHRONIZING MACRO CELL AND SMALL CELL SYSTEMS

(75) Inventors: Jialin Zou, Randolph, NJ (US); Subramanian Vasudevan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 141 days.

(21) Appl. No.: 13/051,071

(22) Filed: Mar. 18, 2011

(65) Prior Publication Data

US 2012/0236977 A1  Sep. 20, 2012

(51) Int. Cl.
*H04W 56/00* (2009.01)
*H04J 3/06* (2006.01)
*H04L 7/04* (2006.01)

(52) U.S. Cl.
CPC .......... *H04W 56/0015* (2013.01); *H04J 3/0682* (2013.01); *H04L 7/042* (2013.01); *H04W 56/00* (2013.01)

(58) Field of Classification Search
CPC . H04W 56/0015; H04W 56/00; H04J 3/0682; H04L 7/042
USPC .......... 370/352–356, 330, 328, 311; 455/501, 455/422.1
See application file for complete search history.

(56) References Cited

U.S. PATENT DOCUMENTS

| | | | |
|---|---|---|---|
| 7,047,011 B1 * | 5/2006 | Wikman | 455/442 |
| 2002/0003786 A1 * | 1/2002 | Kim et al. | 370/335 |
| 2003/0210713 A1 * | 11/2003 | Abdel-Ghaffar | 370/503 |
| 2007/0064639 A1 * | 3/2007 | Terasawa et al. | 370/320 |
| 2009/0285143 A1 * | 11/2009 | Kwun et al. | 370/311 |
| 2010/0039992 A1 * | 2/2010 | Prakash et al. | 370/328 |
| 2010/0157906 A1 * | 6/2010 | Yang et al. | 370/328 |
| 2010/0222068 A1 * | 9/2010 | Gaal et al. | 455/450 |
| 2010/0273490 A1 * | 10/2010 | Velde et al. | 455/436 |
| 2011/0039551 A1 * | 2/2011 | Tsuboi et al. | 455/424 |
| 2011/0081937 A1 * | 4/2011 | Nakamura | 455/522 |
| 2011/0128916 A1 * | 6/2011 | Kwon et al. | 370/328 |
| 2012/0003970 A1 * | 1/2012 | Iwamura | 455/422.1 |
| 2012/0039183 A1 * | 2/2012 | Barbieri et al. | 370/241.1 |

(Continued)

FOREIGN PATENT DOCUMENTS

| | | |
|---|---|---|
| JP | 2013511904 A | 4/2013 |
| WO | WO 2010/025147 | 3/2010 |
| WO | WO-2011063047 A1 | 5/2011 |

OTHER PUBLICATIONS

Invitation to Pay Fees and Partial Search Report dated Jul. 11, 2012.
Mediatek, "Timing Synchronization for Home eNB," 3GPP TSG RAN WG4 Meeting #53, Nov. 9-Nov. 13, 2009.
Qualcomm Europe, "HeNB Timing Requirements," 3GPP TSG-RAN WG4 #51, May 4-8, 2009.

(Continued)

*Primary Examiner* — Khaled Kassim
(74) *Attorney, Agent, or Firm* — Harness, Dickey & Pierce, P.L.C.

(57) ABSTRACT

Example embodiments are directed to a method including transmitting, by a small cell, a pilot signal to a user equipment (UE) based on a first training signal received from the UE, and receiving, by the small cell, a second training signal from the UE. The second training signal is offset by a time based on the pilot signal transmitted by the small cell. The time offset represents a difference in time between the UE receiving a reference signal transmitted by a macro cell and the UE receiving the pilot signal transmitted by the small cell. The small cell adjusts a local reference timing based on the second training signal.

16 Claims, 7 Drawing Sheets

(56) References Cited

U.S. PATENT DOCUMENTS

2012/0040659 A1* 2/2012 Iwamura et al. ............ 455/422.1
2012/0113843 A1* 5/2012 Watfa et al. .................... 370/252
2012/0157101 A1* 6/2012 Uemura et al. ............... 455/436
2012/0170545 A1* 7/2012 Yamamoto .................... 370/330
2012/0178482 A1* 7/2012 Seo et al. ...................... 455/501

OTHER PUBLICATIONS

CMCC, "TD-LTE HeNB synchronization schemes and requirements," 3GPP TSG RAN WG4 Meeting #52, Aug. 24-28, 2009.
Japanese Office Action and English translation thereof dated Aug. 5, 2014.

* cited by examiner

METHODS FOR SYNCHRONIZING MACRO CELL AND SMALL CELL SYSTEMS

BACKGROUND

Example embodiments relate to small cell and macro cell synchronization.

Mobile radio frequency band(s) are both scarce and precious resources. After the inception of commercial mobile radio communication in the 1980's the numbers of subscribers have been growing exponentially. The underlying radio technology also has grown at a fast pace. In addition to conventional voice communication, data, video and real time gaming have been introduced.

These new services require a relatively higher number of bits transmitted in a unit time than conventional voice services. There are two main ways to achieve larger bit rate demands, first, efficient use of spectrum using advanced technology (based on, for example, multiple transmit and receive antennas) and, second, the use of a larger frequency band. As the frequency spectrum is already crowded the latter is often not feasible.

Introduction of the cellular concept in the 1980's allowed efficient reuse of frequency spectrums. A service area may be divided into hexagonal grids of cells, which are further grouped into clusters of cells. The frequency band may be apportioned within and reused between the clusters so as to intelligently keep the co-channel interference low.

Next generation wireless technologies are based on code division multiple access (CDMA) technologies that are more robust to interference and thus universal frequency reuse or re-use of the same frequencies across cells was introduced in 2nd and $3^{rd}$ generation CDMA networks.

Orthogonal frequency division multiplexing (OFDM) technology is the technique used for future 4G or International Mobile Telecommunications (IMT)-advanced networks. While OFDM is a spectrally efficient scheme and is also more suitable for multiple antenna techniques (MIMO), OFDM is more susceptible to interference. Therefore, the efficient and intelligent use of the frequency spectrum across cells is important for successful deployment of the OFDM networks.

Substantial research effort has been devoted to improve spectral efficiency, or in other words, frequency reuse of the OFDM system. Several solutions have been proposed, e.g., fractional frequency reuse (FFR) (dynamic and static), inter-cell interference coordination (ICIC) and small cell deployment (heterogeneous networks).

FFR uses a portion of the spectrum for a certain area of the cell. The portion of the spectrum is dynamically changed or allocated in a static manner. If the spectrum is dynamically allocated the uplink control signals from the surrounding cells may be used to make the allocation decisions.

In ICIC the cells periodically share some metric, for example a channel quality indicator (CQI), of a frequency band via the backhaul communication interface. A cell makes the decision to allocate a frequency band from its own measurements and the information received from the surrounding cells.

Small cell deployments within a larger macro cell efficiently use the spectrum and deliver the demand for the higher bit rate in certain areas of the cell. Generally the small cells use lower transmit power to serve a small area where the demand for the service is high, or in other words, they have a cell radius of a few meters to a few hundred meters. Small cells may use wireless or wired backhaul connections to the back bone network.

Indoor and outdoor pico cells, femto cells and micro cells are the main types of small cells. The categorization of the small cells are based on, for example, their transmit power levels, deployment scenarios and/or the ownership of the small cell network. If different types of small cells are deployed within a macro cell the network is also called a heterogeneous network.

FIG. 1 illustrates a conventional heterogeneous network 100. As shown, a plurality of cells 105 are arranged in a hexagonal grid of cells. Each cell may include one or more antennas 115 associated with, for example, a base station (not shown). One or more of the cells may include a plurality of small cells 115 to support services in a localized area within a cell 105. An enhanced nodeB (eNB) 110 serves the plurality of cells 105.

The widely used GSM, GPRS, UMTS, HSDPA and HSUPA wireless macro cellular standards were created by the third generation partnership project (3GPP). 3GPP recently finalized the LTE standard (Release 8) and is working towards their new standards namely, releases 9 and 10. Release 10 is targeted to satisfy the IMT-advanced specifications. Currently several operators around the world are planning to deploy LTE technology for their future cellular network with macro cells, pico cells and femto cells to deliver the demand for the higher data rates.

In a heterogeneous network such as FIG. 1, macro coverage is overlapped with spotty small cell coverage at commercial areas or residential areas. Most of the small cells, such as femto cells or even public pico cells, are deployed in indoor environments. Thus, there is difficulty for indoor small cells to be synchronized with the umbrella macro cells. A common synchronization method is based on GPS. However, indoor small cells have difficulty in acquiring the GPS signals. The measured strength of the GPS signals indoor is 30 dB lower than the measured strength of the GPS signals outdoors. Furthermore, due to a cost constraint, many small cells do not have a GPS receiver.

SUMMARY

Example embodiments disclose methods of synchronizing macro cells and femto cells. The inventors have discovered that when a UE is attached or on the macro cell, the UE is tracking the macro system time and is synchronized with the macro. The UE measures the time offset of a femto and reports the time offset to an enhanced nodeB (eNB) of the macro cell. The eNB of the macro cell processes the UE report and notifies the time offset to the femto cell nodeB (HeNB) via an X2 or other network connection. The HeNB adjusts the time offset based on the received information.

In at least another example embodiment, a UE transmits training signals to a HeNB at a femto training access slot. Before the HeNB is awakened, the HeNB monitors a dedicated synchronization access slot (or channel with a dedicated preamble assigned for this purpose). When the HeNB receives the training signals, the HeNB acquires the signal and tracks the training signal first. Based on the total delay offset, the HeNB adjusts its local timing to be synchronized with the macro system.

In at least one example embodiment a method includes transmitting, by a small cell, a pilot signal to a user equipment (UE) based on a first training signal received from the UE, and receiving, by the small cell, a second training signal from the UE. The second training signal is offset by a time based on the pilot signal transmitted by the small cell. The time offset represents a difference in time between the UE receiving a reference signal transmitted by a macro cell and the UE receiving the pilot signal transmitted by the small cell. The small cell adjusts a local reference timing based on the second training signal.

At least another example embodiment discloses a method including transmitting, by a small cell, a first signal to a user equipment (UE), and receiving, by the small cell, time offset information from a macro cell configured to communicate with the UE. The time offset information represents a time offset between a difference in time between the UE receiving a signal transmitted by the macro cell and the UE receiving the pilot signal.

At least another example embodiment discloses a small cell including a transceiver. The transceiver is configured to, transmit a pilot signal to a user equipment (UE) based on a first training signal received from the UE, receive a second training signal from the UE and adjust a local reference timing of the small cell based on the second training signal. The second training signal is offset by a time offset based on the pilot signal transmitted by the small cell, the time offset represents a difference in time between the UE receiving a signal transmitted by a macro cell and the UE receiving the pilot signal transmitted by the small cell.

At least another example embodiment discloses a user equipment (UE) configured to receive a reference signal from a macro cell, receive a pilot signal from a small and determine time offset information based on the reference signal and the pilot signal, the time offset information representing a difference in time between the receiving the reference signal and receiving the pilot signal

BRIEF DESCRIPTION OF THE DRAWINGS

Example embodiments will be more clearly understood from the following detailed description taken in conjunction with the accompanying drawings. FIGS. 1-4B represent non-limiting, example embodiments as described herein.

FIG. 1 illustrates a conventional heterogeneous network;

FIG. 2 illustrates a heterogeneous network according to an example embodiment;

FIGS. 4A-4B illustrate a method of synchronizing a HeNB with a macro cell eNB according to at least another example embodiment.

DETAILED DESCRIPTION

Figure 1:
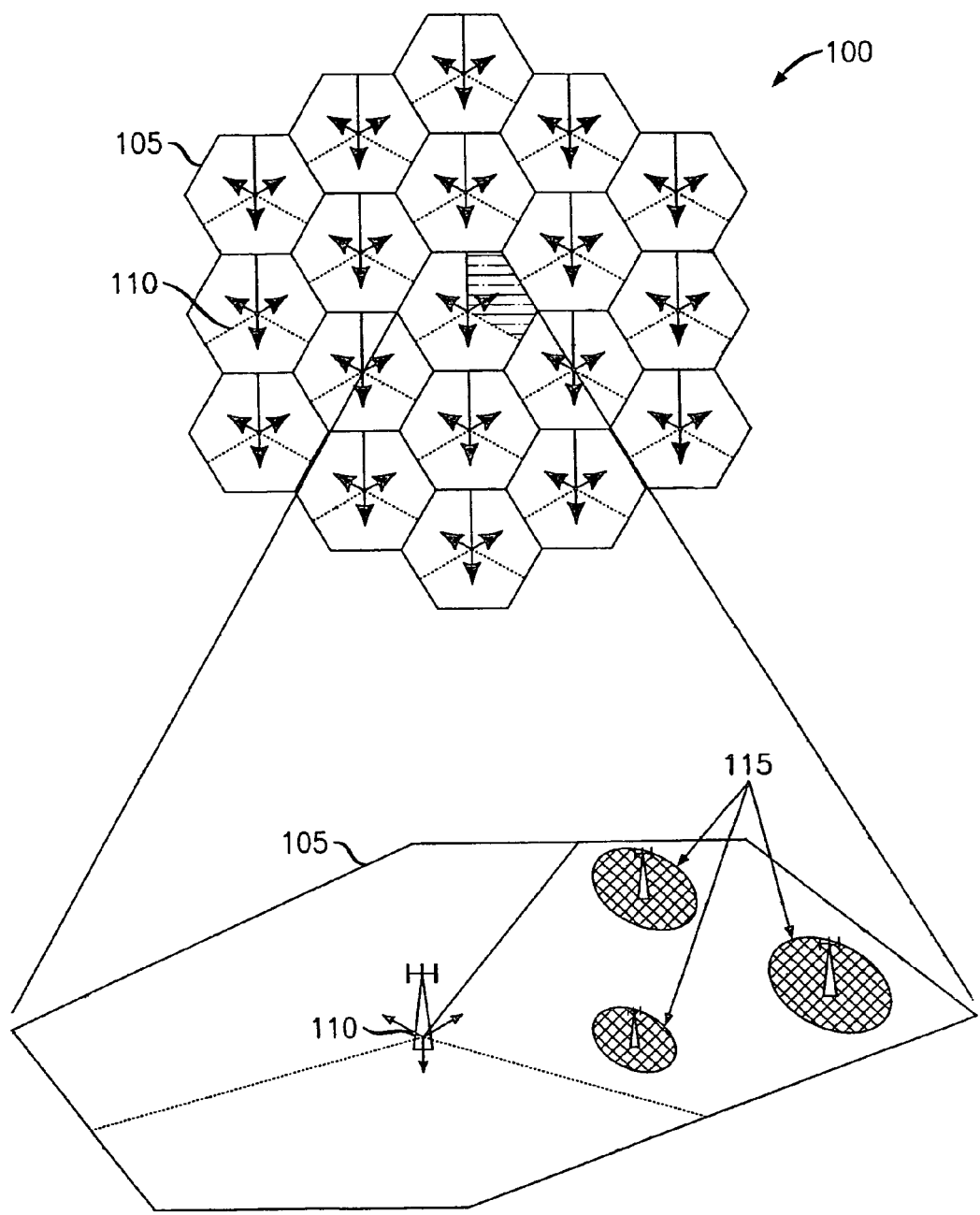

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the teen "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, ter ills, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

As used herein, the term "user equipment" (UE) may be synonymous to a mobile user, mobile station, mobile terminal, user, subscriber, wireless terminal and/or remote station and may describe a remote user of wireless resources in a wireless communication network. The term "nodeB" may be understood as a one or more cell sites, base stations, transceivers, access points, and/or any terminus of radio frequency communication. Although current network architectures may consider a distinction between mobile/user devices and access points/nodeBs, the example embodiments described hereafter may generally be applicable to architectures where that distinction is not so clear, such as ad hoc and/or mesh network architectures, for example. Serving nodeB may refer to the cell site currently handling the needs of the UE.

Figure 2:
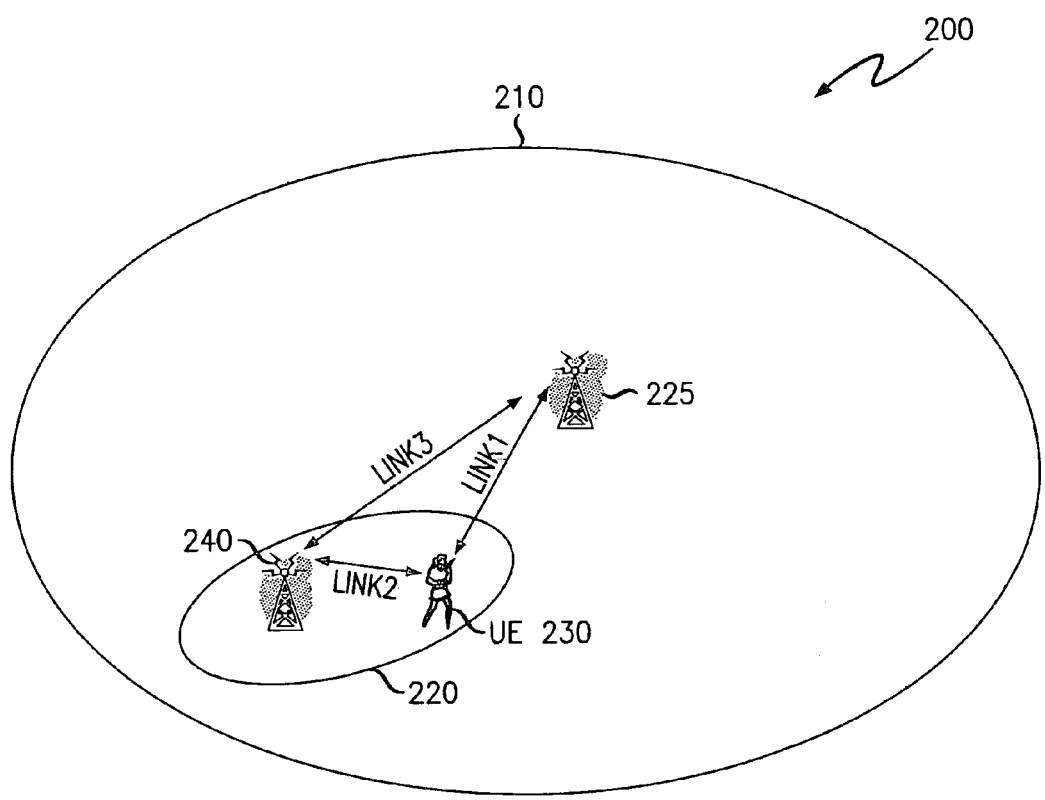

FIG. 2 illustrates a heterogeneous network 200 according to an example embodiment. As shown, the heterogeneous network 200 includes a macro cell 210 and a small cell 220 within the macro cell 210. The small cell 220 may be a femto cell or any other small cell type such as a pico cell or micro cell. For the sake of clarity and brevity, the small cell 220 will be referred to as a femto cell.

It should be understood that the macro cell 210 may include a plurality of femto cells. A serving macro eNB 225 may serve a UE within the macro cell 210. As shown, the UE 230 and the serving macro eNB 225 may communicate over a first link LINK1. The first link LINK1 is a wireless link. The first link LINK1 may follow any known wireless standard such as 3G and/or LTE.

Over the first link LINK1, the UE 230 synchronizes with the serving macro eNB 225. To synchronize with the serving macro eNB 225, the UE 230 searches and acquires pilot signals from the serving macro eNB 225. Based on the acquired pilot signals, the UE 230 determines a frame boundary and frame number of the pilot signals received from the serving macro eNB 225. The UE 230 then adjusts a local reference timing of the UE 230 to be aligned with the frame boundaries and the frame number associated with the received signals from the serving macro eNB 225. In other words, the local reference timing of the UE is synchronized the signals received from the macro eNB, which have a propagation delay between the macro eNB and the UE.

The UE may adjust its local reference timing using hardware implementation. For example, in a CDMA search and acquisition, a local signal is aligned with a received signal such that a correlation peak is reached. Software may set a value of the timing adjustment to the hardware.

As shown, the UE 230 is located within the femto cell 220. Thus, the UE 230 may communicate with a femto cell nodeB (HeNB) 240. If the UE 230 is a part of the femto cell 220, the UE 230 communicates with the HeNB 240 over a second communication link LINK2.

The serving macro eNB 225 may communicate with the HeNB 240 over a communication link LINK3. The communication link LINK3 may be X2 or any other network connection that is known. With the heterogeneous network 200 being described, methods of synchronizing the HeNB 240 and the serving macro eNB 225 will be described.

Figure 3A:
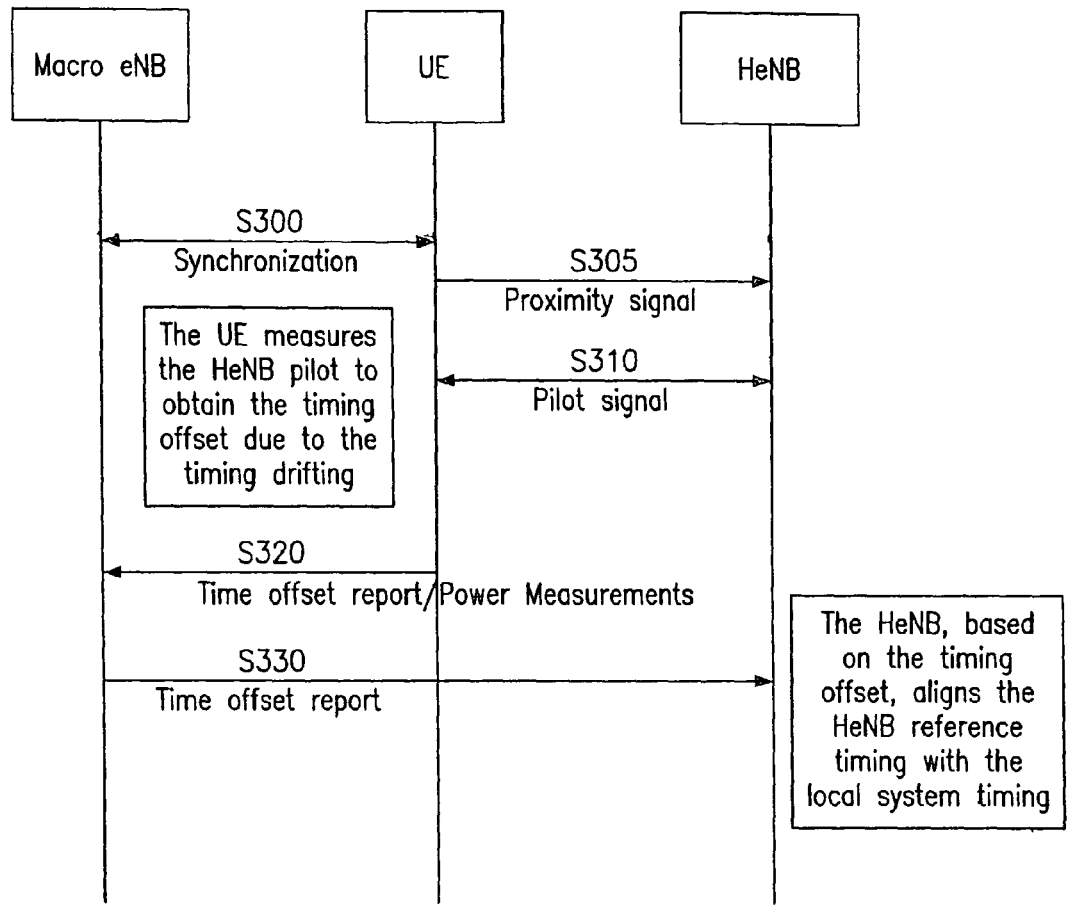
FIGS. 3A-3B illustrate a method of synchronizing a HeNB with a macro cell eNB according to an example embodiment.
Figure 3B:
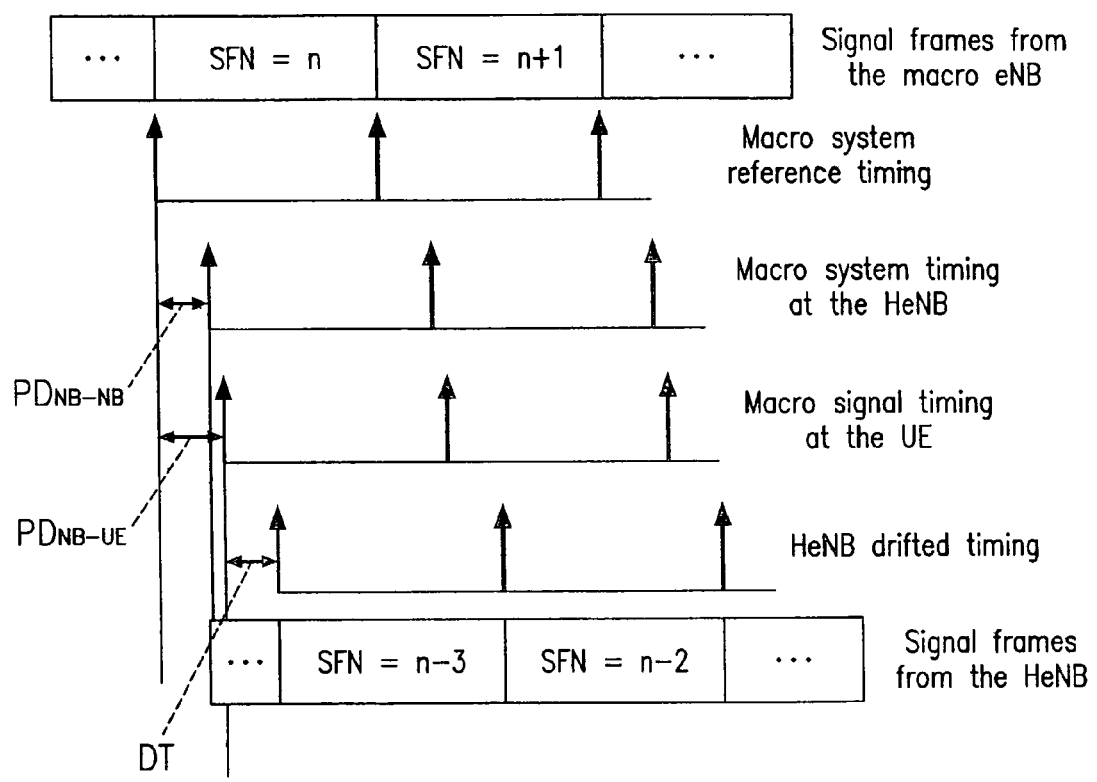

FIGS. 3A-3B illustrate a method of synchronizing a HeNB with a serving macro eNB according to an example embodiment. It should be understood that the method of FIGS. 3A-3B may be implemented in the heterogeneous network 200.

At S300, the UE synchronizes with the serving macro eNB. The synchronization process is the same as the synchronization process described above with reference to FIG. 2. Therefore, for the sake of brevity, a description of the synchronization process will not be repeated.

The UE is configured to determine locations of HeNBs associated with the UE. Moreover, upon an initial connection with the HeNB, the UE stores information about the HeNB such as an identification (ID) of the HeNB, a transmitting frequency of the HeNB, neighboring cell info information and a location of the HeNB.

The UE includes GPS and, thus, may store location information when the UE is near the HeNB. Other methods exist that allow a UE to know the location of the HeNB and may be used herein. For the sake of brevity, these methods are not described.

The UE is configured to determine whether an associated HeNB is nearby based on the stored information. For example, an associated HeNB may be nearby if it is within a few hundred meters of the UE. When the UE moves close to the HeNB, the proximity will trigger the HeNB to transmit femto cell pilot signals. Proximity is known and defined in the LTE standards. Therefore, for the sake of brevity, proximity will not be described.

More specifically, when the UE is near an associated HeNB, the UE transmits a proximity message to the serving macro eNB, at S305. The serving macro eNB forwards the notification to the HeNB. Upon receipt of the notification, the HeNB changes from a sleeping mode to an active mode.

Thus, at S310, the HeNB transmits a femto cell pilot (reference) signal and the UE receives the femto cell pilot signal. When the UE receives the femto cell pilot signal, the UE measures the femto cell pilot signal to determine the time offset of the femto cell pilot signal relative to a UE's local reference timing, which is synchronized with the serving macro eNB timing. The time offset of the femto cell pilot signal is an offset drifting from a reference timing of the serving macro eNB received at the UE. The time offset of the femto cell pilot signal is illustrated as DT in FIG. 3B.

The UE is configured to compare frame boundaries of the femto cell pilot signal with the frame boundaries of the received signals from the serving macro eNB.

More specifically, the UE determines the time offset by measuring the correlation peak of the strength of the femto cell pilot signal and then determines the frame boundaries of the femto cell pilot signal from the HeNB. The UE compares the timing of the frame boundaries of the received femto cell pilot signal from the HeNB and the UE's local reference timing. Since the UE is synchronized with the serving macro eNB (based on signals received from the serving macro eNB such as a reference signal), the UE's local reference timing is aligned with the received signal (e.g., the reference signal) from the serving macro eNB. As a result, based on the comparison, the UE obtains the time offset between the frame boundaries of the femto cell pilot signal received from the HeNB and the received signal from the serving macro eNB.

At S320, the UE sends a time offset report (time offset information), including the time offset, of the femto cell to the serving macro eNB. Without calibration over a long time, the drifting of the local reference timing of the HeNB may lead to a time offset more than one frame. In LTE, a frame duration is 10 ms. Therefore, a UE determines the time offset between the frame boundaries of the femto cell pilot signal from the HeNB (local signal) and the signal received from the serving macro eNB. The UE also receives system frame numbers (SFNs) broadcasted by the serving macro eNB and the HeNB, respectively, and determines a difference between the SFNs (a frame offset). For example, in FIG. 3B, the time offset leads to a time offset between a SFN n from the serving macro eNB and a SFN n−3 from the HeNB.

Therefore, the time offset report includes the time offset between the frame boundaries of the signal from the HeNB (local signals) and the signal received from the serving macro eNB at an accuracy of at least 0.1 μs and a difference between the SFN received from the serving macro eNB and the SFN received from the HeNB. In addition to the time offset report, the UE reports power measurements of the HeNB and other neighboring cells. Under the LTE standards, a UE reports power measurements of neighboring cells. Therefore, the UE may determine the power measurements of the HeNB and other neighboring cells through any known means.

The time offset report may be transmitted by the UE in air interface message. For example, in LTE, a new information element (IE) may be added to an existing message UEInformationResponse.

Figure 3C:
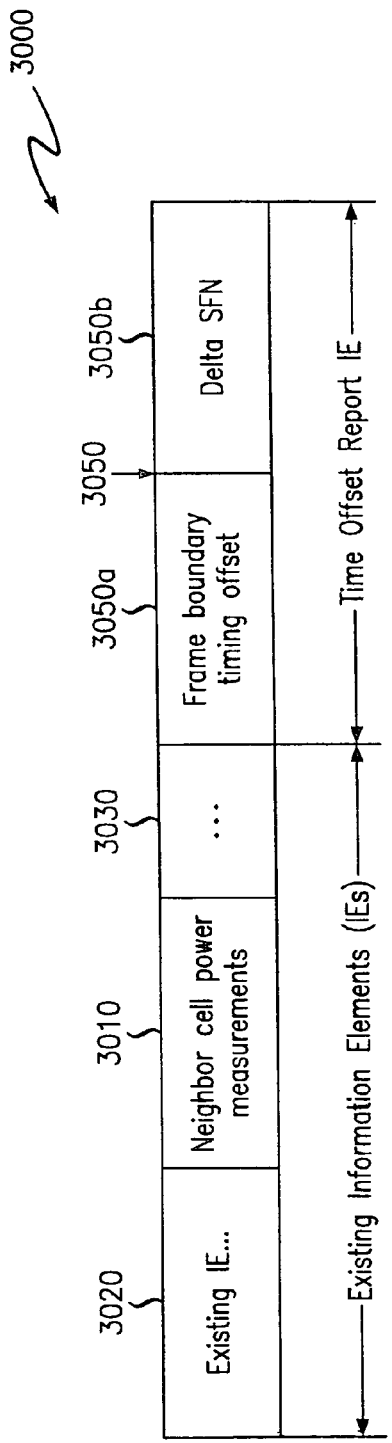
FIG. 3C illustrates an air interface message according to an example embodiment.

FIG. 3C illustrates an example of the UEInformationResponse including the IE having the time offset report. As shown, a UEInformationResponse 3000 includes known information elements 3010, 3020 and 3030. The IE 3010 includes the power measurements of the neighboring cells. The UEInformationResponse 3000 also includes a time offset report IE 3050. The time offset report IE 3050 includes two fields 3050a and 3050b. The field 3050a includes the time offset and the field 3050b includes the frame offset. The field 3050a may be 24 bits, for example. The field 3050b may have a range of 0-100, for example, which is the frame offset.

A size of a femto cell is generally less than 300 m in diameter. Therefore, a propagation delay (e.g., over the communication link LINK2) between the HeNB and the UE is less than 0.1 μs and, consequently, may be ignored.

Therefore, a propagation delay $PD_{NB-NB}$ (shown in FIG. 3B) which is from the serving macro eNB to the HeNB may be considered the same as a propagation delay $PD_{NB-UE}$ (shown in FIG. 3B) which is a one way propagation delay from the serving macro eNB to the UE.

The time offset of the femto cell pilot signal DT (shown in FIG. 3B) measured at the UE is considered as the offset drifting from the local macro reference timing.

Referring to FIG. 3A, after the serving macro eNB receives the time offset report including the time offset between the frame boundaries and the SFN difference, the serving macro eNB may forward the time offset report to the HeNB via X2 (if it is available) or another network connection (e.g., over an HeNB gateway), at S330.

The serving macro eNB will send the time offset report to the HeNB if at least one of the following conditions are met:
 1. HeNB_power_measurement>power_threshold (the UE is close enough to the HeNB);
 2. TimingOffset_HeNB>offset_threshold; and
 3. A periodic reporting timer.

wherein HeNB_power_measurement is the measured power of a signal transmitted by the HeNB and received by the UE, the power_threshold is a power threshold used to determine whether a UE is close enough to the HeNB, the TimingOffset_HeNB is the determined time offset and the offset_threshold is a time threshold. The power_threshold and the offset_threshold may be determined based on the conditions of the network and/or empirical data.

When one of the three conditions is met, the serving macro eNB sends the time offset report to the HeNB, including the difference between the SFN received from the serving macro eNB and the SFN received from the HeNB and the time offset, even if the time offset TimingOffset_HeNB is smaller than the offset_threshold (e.g., when condition (3) is met).

Similar to the air interface message transmitted by the UE to the serving macro eNB, the time offset report that is transmitted by the serving macro eNB may be transmitted in a network message. The network message may be a new message or a new IE that includes time offset report in an existing network message.

Figure 3D:
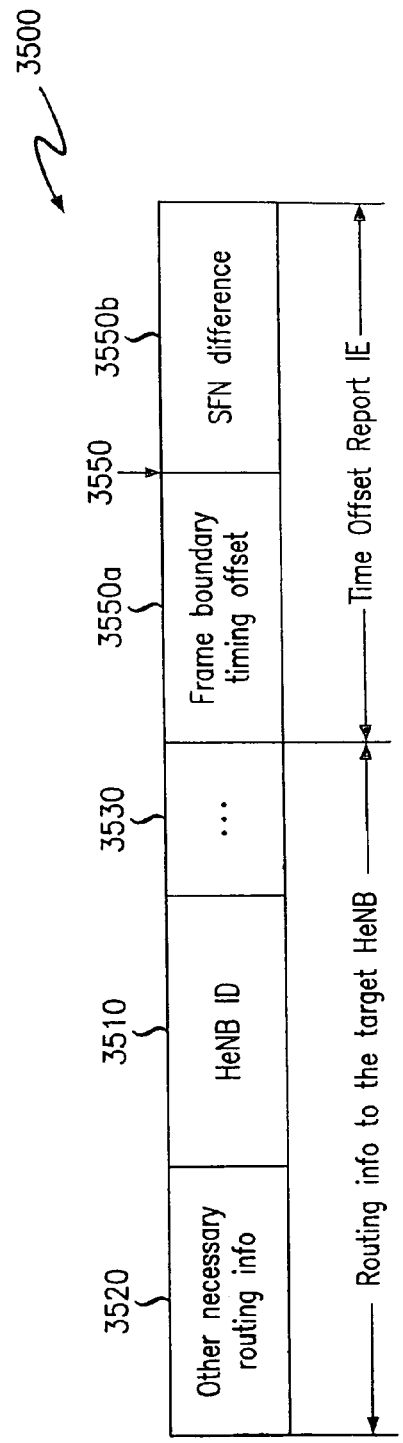
FIG. 3D illustrates a network message according to an example embodiment.

FIG. 3D illustrates an example network message including the IE having the time offset report. As shown, a network message 3500 includes known information elements 3510, 3520 and 3530. The IE 3510 includes the ID of the HeNB. In addition to the ID of the HeNB, the network message 3500 includes other routing information in IEs 3520 and 3530, such as an associated network ID such that the network may deliver the network message 3500 to the HeNB.

The network message 3500 also includes a time offset report IE 3550. The time offset report IE 3550 is the same as the time offset report IE 3050. Therefore, for the sake of brevity, a description of the time offset report IE 3550 will not be provided.

The HeNB adjusts a femto cell (HeNB) reference timing such that the femto cell time offset measured at the UE becomes 0. Moreover, the HeNB includes an SFN counter. The HeNB adjusts the SFN counter based on the frame difference (frame offset) such that the SFN counter is synchronized (aligned) with an SFN counter of the serving macro eNB. The UE may then receive same SFNs from both the serving macro eNB and the HeNB at the same time. Consequently, the HeNB is in synchronization with the serving macro eNB timing and aligned with a serving macro signal.

Figure 4A:
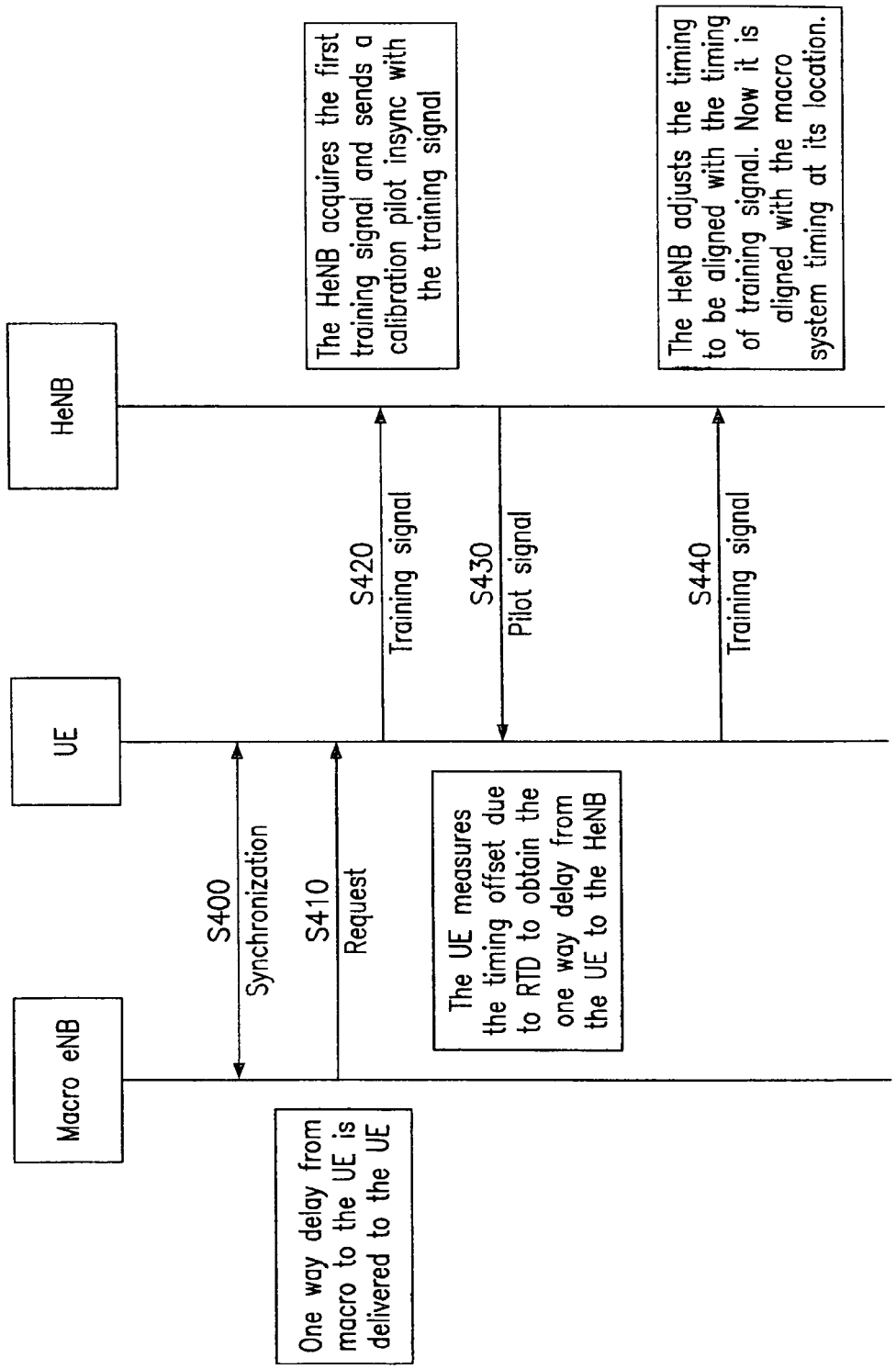
Figure 4B:
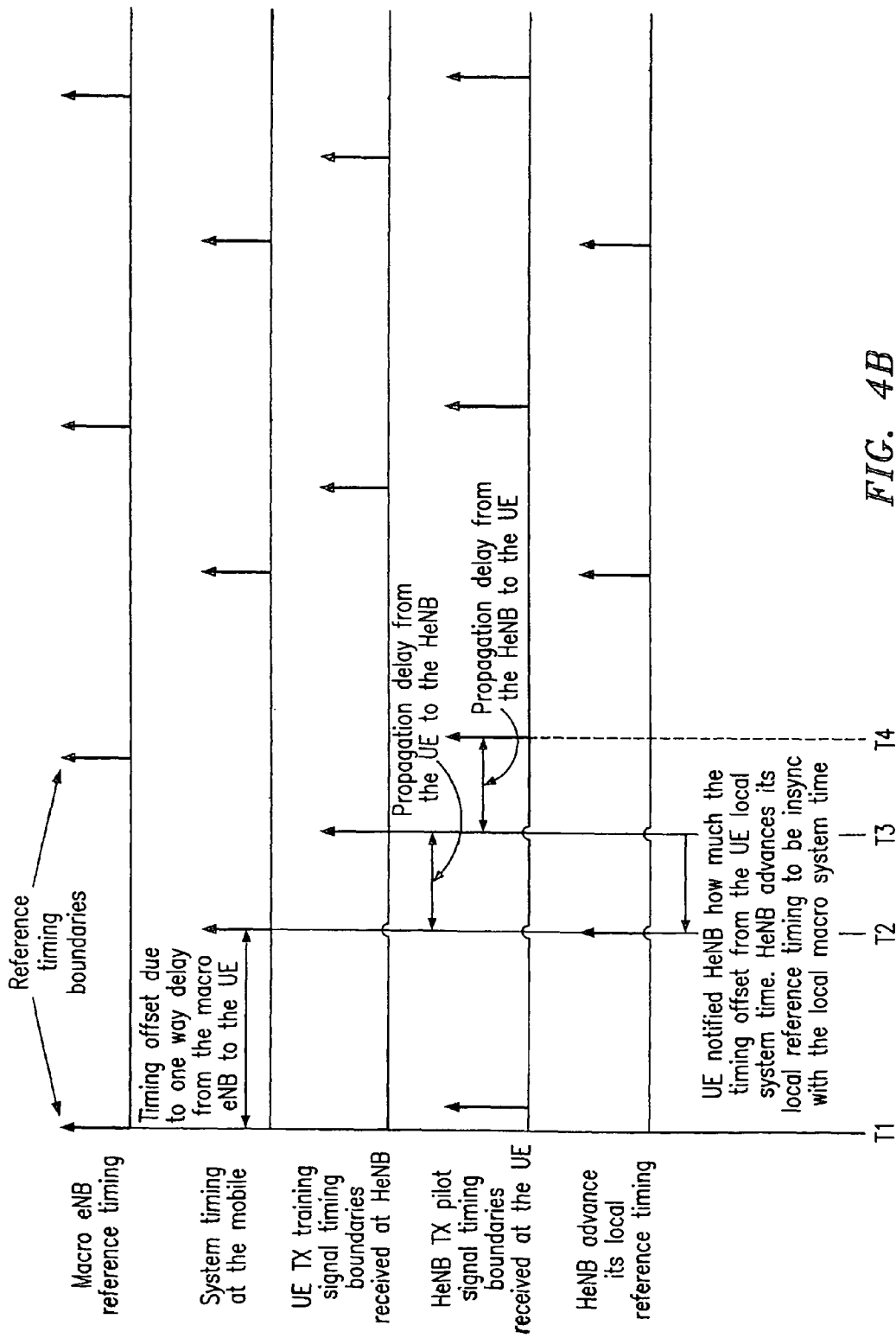

FIGS. 4A-4B illustrate a method of synchronizing a HeNB with a serving macro eNB according to at least another example embodiment. It should be understood that the method of FIGS. 4A-4B may be implemented in the heterogeneous network 200.

At S400, the UE synchronizes with the serving macro eNB. The synchronization process is the same as the synchronization process described above with reference to FIG. 2. Therefore, for the sake of brevity, a description of the synchronization process will not be repeated.

At S410, the serving macro eNB requests the UE to assist the HeNB. Based on the location information of the UE and the HeNB, and femto ownership information of the UE, the serving macro eNB sends a message to the UE to request the UE to wake up the HeNB. The femto ownership information is known to the network.

The UE determines whether the UE is within a threshold distance of the HeNB based on the HeNB location information stored in the UE. If the UE is within the threshold distance of the HeNB, the UE transmits a training signal to the HeNB, at S420.

The training signal may be a specific for of radio waveform dedicated for the purposed of training the HeNB. For example, in LTE, the access probe send may be used by the UE with a preamble associated with an orthogonal code and dedicated for the purpose of training the HeNB.

Frame boundaries of the training signal are the same as UE local reference timing boundaries.

When in a sleeping mode, the HeNB periodically monitors an access channel. The training signal serves as a wake up signal for the HeNB if the HeNB is in the sleeping mode. The UE may use existing access mechanisms for transmitting the training signal. For example, the UE may request round trip delay information.

At S430, the HeNB wakes up (if previously in sleep mode), receives the first training signal and transmits a pilot signal.

At S440, the UE receives the pilot signal from the HeNB and measures the time offset based on the round trip delay.

More specifically, the UE determines the propagation delay (one way delay) from the UE to the HeNB by dividing the round trip delay in half. Based on the one way delay determined by the UE, the UE transmits the first timing signal at an advanced time to compensate for the propagation delay from the HeNB to the UE, at S440.

The HeNB tracks the training signal by processing the received training signals and identifying frame boundaries of the received training signals. The HeNB adjusts its local reference time to align frame boundaries of signals transmitted from the HeNB with the received training signals.

In other words, upon receiving the first training signal at S440, the HeNB becomes in synchronization with the local reference timing of the UE which is considered as the serving macro eNB reference timing with the one way delay toward the UE.

For example, FIG. 4B illustrates a timing diagram of the method shown in FIG. 4A. At a time T1, the serving macro eNB requests the UE to assist in synchronizing the HeNB. Due to a propagation delay between the serving macro eNB and the UE, the UE receives the request at a time T2. Upon receipt of the request, the UE transmits the first training signal to the HeNB. The HeNB receives the first training signal at a time T3 due to the propagation delay between the UE and the HeNB. The HeNB transmits at the pilot signal to the UE based on the first training signal. The UE receives the HeNB pilot signal at a time T4. Based on the round trip information (T4−T2), the UE determines a one way delay from the UE to the HeNB.

The UE then transmits the training signal at an advanced time to notify the HeNB to advance the HeNB local reference timing to be in synchronization with the local timing at the UE. The HeNB adjusts its local reference time to align frame boundaries of signals transmitted from the HeNB with the received training signals.

When a UE is attached or camped on the macro cell, the UE is tracking the macro system time and is synchronized with the macro. Example embodiments provide that the UE measures the time offset of a femto cell and reports the time offset to the serving macro eNB of the umbrella macro cell. The serving macro eNB of the macro cell processes the UE report and notifies the time offset to the HeNB via X2 or other network connection. The HeNB adjusts the time offset based on the received information.

In at least another example embodiment, a UE transmits training signals to a HeNB at a femto training access slot. Before the HeNB is awaken, the HeNB monitors a dedicated synchronization access slot (or channel with a dedicated preamble assigned for this purpose). When the HeNB receives the training signals, the HeNB acquires the signal and tracks the training signal first. Based on the total delay offset, the HeNB adjusts its local timing to be synchronized with the macro system.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method comprising:
transmitting, by a small cell, a pilot signal to a user equipment (UE) based on a first training signal received from the UE;
receiving, by the small cell, a second training signal from the UE, the second training signal being offset by a time based on round trip information, the round trip information including a first propagation delay between the UE and small cell for the first training signal and a second propagation delay between the small cell and the UE for the pilot signal transmitted by the small cell, the time offset representing a difference in time between the UE receiving a reference signal transmitted by a macro cell and the UE receiving the pilot signal transmitted by the small cell;
adjusting, by the small cell, a reference timing of the small cell directly based on the second training signal;
wherein the transmitting transmits the pilot signal based on the reference timing of the small cell; and
wherein the time offset is one half of a round trip delay.

2. The method of claim 1, wherein the first receiving receives the first training signal while in a sleep mode.

3. The method of claim 1, wherein the adjusting includes, shifting the reference timing of the small cell to synchronize with a timing of the macro cell.

4. The method of claim 1, wherein the second training signal is based on a propagation delay between the macro cell and the UE.

5. A method, comprising:
transmitting, by a small cell, a first signal to a user equipment (UE);
receiving, by the small cell, time offset information from a macro cell configured to communicate with the UE, the time offset information representing a difference in time between the UE receiving a reference signal transmitted by the macro cell and the UE receiving the first signal, the time offset information including a difference in time between frame boundaries of the first signal received at the UE and frame boundaries of the reference signal transmitted by the macro cell received at the UE, the time offset information further including a frame offset, the frame offset being a difference between a system frame number (SFN) of the first signal and a SFN of the reference signal transmitted by the macro cell;

adjusting, by the small cell, a SFN counter based on the frame offset; transmitting, by the small cell, a second signal to the UE, the transmitting the second signal being synchronized with transmissions by the macro cell to the UE; and transmitting, by the small cell, a second signal offset in time, the second signal offset based on the time offset information.

6. The method of claim 5, wherein the transmitting transmits the first signal if the UE is within a threshold distance of the small cell.

7. The method of claim 5, wherein the first signal is a pilot signal.

8. The method of claim 5, further comprising:
resetting, by the small cell, the SFN counter based on the frame offset.

9. The method of claim 5, wherein the receiving receives the time offset information in a network message.

10. The method of claim 9, further comprising:
transmitting, by the UE, the time offset information to the macro cell.

11. The method of claim 5, wherein the receiving receives the time offset information if at least one of the following occur, a measured power of the small cell is above a threshold, the difference in time between the UE receiving the signal transmitted by the macro cell and the UE receiving the pilot signal exceeds a time threshold and if a period of time ends.

12. A small cell comprising:
a transceiver configured to,
transmit a pilot signal to a user equipment (UE) based on a first training signal received from the UE,
receive a second training signal from the UE, the second training signal being offset by a time offset based on round trip information, the round trip information including a first propagation delay between the UE and small cell for the first training signal and a second propagation delay between the small cell and the UE for the pilot signal transmitted by the small cell, the time offset representing a difference in time between the UE receiving a signal transmitted by a macro cell and the UE receiving the pilot signal transmitted by the small cell;
adjust a local reference timing of the small cell directly based on the second training signal;
wherein the transmitting transmits the pilot signal based on the reference timing of the small cell; and
wherein the time offset is one half of a round trip delay.

13. A user equipment (UE) configured to receive a reference

Signal from a macro cell, receive a pilot signal from a small cell and determine time offset information based on the reference signal and the pilot signal, the time offset Information representing a difference in time between the receiving the reference Signal and receiving the pilot signal, the time offset information including a difference in time between frame boundaries of the pilot signal received at the UE and frame boundaries of the reference signal transmitted by the macro cell received at the UE, the time offset information further including a frame offset, the frame offset being a difference between a system frame number (SFN) of the first signal and a SFN of the reference signal transmitted by the macro cell, the time offset information permitting the small cell to adjust a SFN counter based on the frame offset;
transmitting, by the small cell, a second signal to the UE, the transmitting the second signal being synchronized with transmissions by the macro cell to the UE; and
transmitting, by the small cell, a second signal offset in time, the second signal offset based on the time offset information.

14. The method of claim 1, wherein the second training signal is not transmitted by the macro cell.

15. The method of claim 5, wherein the small cell is one of a femto cell, pico cell or micro cell.

16. The method of claim 5, wherein the small cell in within the macro cell.

* * * * *